(12) United States Patent
Gaul et al.

(10) Patent No.: US 8,344,686 B2
(45) Date of Patent: Jan. 1, 2013

(54) METHOD AND A DEVICE FOR CHARGING ELECTRIC VEHICLES

(75) Inventors: Armin Gaul, Selm (DE); Ingo Diefenbach, Unna (DE); Benjamin Pehle, Dortmund (DE)

(73) Assignee: RWE AG, Essen (DE)

( * ) Notice: Subject to any disclaimer, the term of this patent is extended or adjusted under 35 U.S.C. 154(b) by 0 days.

(21) Appl. No.: 13/223,900

(22) Filed: Sep. 1, 2011

(65) Prior Publication Data

US 2012/0013301 A1 Jan. 19, 2012

Related U.S. Application Data

(63) Continuation of application No. PCT/EP2010/052448, filed on Feb. 26, 2010.

(30) Foreign Application Priority Data

Mar. 3, 2009 (DE) .......................... 10 2009 011 104
Apr. 8, 2009 (DE) .......................... 10 2009 016 624

(51) Int. Cl.
*H02J 7/14* (2006.01)
*H02J 7/00* (2006.01)
*B60K 6/20* (2007.10)

(52) U.S. Cl. ........ 320/104; 320/127; 320/128; 320/132; 320/134; 320/136; 903/903; 903/907; 180/65.21; 180/65.29

(58) Field of Classification Search .................. 320/104
See application file for complete search history.

(56) References Cited

U.S. PATENT DOCUMENTS

| 7,679,336 B2 * | 3/2010 | Gale et al. ...................... 320/155 |
| 2010/0076825 A1 * | 3/2010 | Sato et al. ..................... 705/14.1 |
| 2010/0164439 A1 * | 7/2010 | Ido ................................. 320/155 |
| 2010/0181957 A1 * | 7/2010 | Goeltner ....................... 320/101 |

FOREIGN PATENT DOCUMENTS

| DE | 43 44 368 C1 | 5/1995 |
| DE | 19800212 A1 | 7/1999 |
| DE | 112008000424 T5 | 12/2009 |
| EP | 2 141 043 A1 | 1/2010 |
| GB | 2 446 694 A | 8/2008 |
| JP | 2008159578 A | 7/2008 |
| JP | 2008278559 A | 11/2008 |
| WO | WO 2008/132947 A1 | 11/2008 |

\* cited by examiner

*Primary Examiner* — Edward Tso
*Assistant Examiner* — Ahmed Omar
(74) *Attorney, Agent, or Firm* — Reinhart Boerner Van Deuren P.C.

(57) ABSTRACT

A method for charging electric vehicles through connecting an electric vehicle to a charging station for receiving electric energy. Different power supply offers can be selected particularly simple in that at least a state of charge of a battery and a desired duration of charge is determined in the vehicle, the energy required for fully charging the battery is determined in the vehicle, at least information concerning the required energy and the duration of charge is transmitted to the charging station by the vehicle and at least one power supply offer adapted to the information is received by the vehicle from the charging station which power supply offer has been determined from among a plurality of different power supply offers by means of the charging station using the information received.

10 Claims, 2 Drawing Sheets

METHOD AND A DEVICE FOR CHARGING ELECTRIC VEHICLES

CROSS-REFERENCE TO RELATED PATENT APPLICATIONS

This patent application is a continuation of PCT Application No. PCT/EP2010/052448, filed Feb. 26, 2010, which claims priority to German Application No. 102009011104.2, filed Mar. 3, 2009 and German Application No. 102009016624.6, filed Apr. 8, 2009, the entire teachings and disclosure of which are incorporated herein by reference thereto.

FIELD OF THE INVENTION

The subject matter relates to a method and a device for charging electric vehicles, wherein an electric vehicle is connected to a charging station for receiving electric energy.

BACKGROUND OF THE INVENTION

The number of electrically operated vehicles will quickly increase in the near future. With an increasing occurrence of electric vehicles driven by an electric motor also their energy supply must be ensured in a very simple manner. For this purpose an effective infrastructure must be provided.

In particular it is necessary to provide facilities for the energy supply of electric vehicles in public areas. Considering operating ranges of electric vehicles available at present between 50 and some 100 kilometers it is mandatory to provide for charging the vehicles also outside their domestic area. For this purpose charging stations should be provided in public areas to make available energy for electric vehicles by means of a supply grid at all times. This availability will be a critical criterion for electric vehicles to be broadly accepted.

However, with charging stations installed in public areas it must be ensured that the customer pays for the energy received. Furthermore it has to be made sure that the customer is informed about the costs to be expected before receiving electric energy. Corresponding to a common refueling process the customer should know the expenses to be expected immediately before charging the battery. Thus, for example, the customer should know the price for one kilowatt hour. Furthermore, charging batteries is rather time consuming. At present it is not yet possible to charge a vehicle battery with the same minimal expenditure of time as is needed for refueling. Thus also the expected charge time is a critical criterion for the consumer. He should know before starting a charging process how long charging will take.

For this reason the subject matter is based on the object to provide a method for charging electric vehicles which provides a highly user-friendly charging interface.

SUMMARY OF THE INVENTION

According to the subject matter this object is achieved by a method for charging electric vehicles, wherein an electric vehicle is connected to a charging station for receiving electric energy, wherein at least a state of charge of a battery and a desired duration of charge is determined in the vehicle, the energy required for fully charging the battery is determined in the vehicle, at least information concerning the required energy and the duration of charge is transmitted to the charging station by the vehicle and at least one power supply offer adapted to the information is received by the vehicle, which power supply offer has been determined from among a plurality of different power supply offers by means of the charging station using the information received.

It was realized that in addition to the amount of energy necessary for fully charging a battery also the time period for charging which a user is prepared to accept is a critical criterion for the charging process. For this reason not only the required energy is determined according to the subject matter, but also the charge time desired by the user is taken into account. Using at least these two parameters it is possible to identify different power supply offers from among a plurality of power supply offers by means of the charging station.

For this purpose the charging station may transmit the information received from the vehicle to a central unit. In the central unit at least one matching power supply offer can be determined using this information, for example concerning the required energy as well as a desired charge time. Said at least one power supply offer can then be transmitted from the central unit to the charging station and from the charging station to the vehicle. Subsequently within the vehicle the desired power supply offer can be selected from among the available power supply offers.

Power supply offers can be differentiated by different current values and different voltage values as well as different prices, for example. Power supply offers may also comprise different production sources. For example, one power supply offer may comprise current produced from renewable energy sources, whereas another power supply offer may comprise current coming from conventional sources.

It is also possible, for example, to offer different pricing models. In a first pricing model it is thus possible, for example, to charge a vehicle at a maximum current of 5 A and a maximum voltage of 230 V. In a second pricing model, for example, it is possible to offer a maximum current of 10 A and a maximum voltage of 360 V. It is also possible that the pricing models differ only regarding the maximum current available. Moreover, it is also possible to make available the maximum current during a full time period according to a first pricing model, whereas, according to a second pricing model, the maximum current may be offered according to a daily load curve. This means for example that a higher current can be made available during nighttime than during daytime or during peak load periods. Depending on the daily load curve, different current values will thus be offered at different times. The user of an electric vehicle may have booked different pricing models with his utility provider, for example, so that he may choose among those.

Since different pricing models require different capacities within the grid of the utility provider, also the prizes may differ. According to an inexpensive pricing model, for example, it is thus possible to receive a lower current at peak load periods and a higher current during periods of lower consumption. However, if a user wants to realize a minimum charge time at any time, a pricing model could be imagined which provides maximum current at a maximum voltage at any time so that the required energy is supplied in the shortest possible time.

Since not only the energy required for fully charging a battery is determined by the vehicle, but also the desired charge time, a corresponding power supply offer can be determined with the aid of the charging station, for example in the central unit, and transmitted to the vehicle. The different power supply offers can be received in the vehicle. Communication between vehicle and charging station can be performed via the TCP/IP protocol, for example.

Power supply offers can be transmitted in an encoded format, for example. Thus it is possible, for example, that a receiver unit in the vehicle has pre-stored parameters of different types of power supply offers. In this case the charging station only has to transmit a reference to the power supply offers determined, and in the vehicle the parameters of this power supply offer can be identified from this reference. For example, power supply offers A, B, C, D can be stored in the vehicle. If the charging station determines that power supply offers A, D are sufficient to supply the necessary energy in the desired charge time, only A and D may be transmitted to the vehicle, for example. Based on these references it is determined in the vehicle which current and which voltage are offered by the different power supply offers and which charge time is to be expected if the user selects one of these power supply offers. Also the energy price for this power supply offer may be stored with a power supply offer.

It is also possible to store charging preferences in a vehicle. For example, the user of a vehicle can indicate that he prefers two specific power supply offers. If one of the power supply offers preferred by the user is among the power supply offers made available by the charging station, this power supply offer may be automatically selected.

It is also possible to transmit a vehicle identification in addition to information concerning the required energy and the desired charge time. With the vehicle identification the charging station is enabled to identify the pricing models booked by the user or for the corresponding vehicle, respectively. In this case the charging station can select the possible pricing models from among the pricing models booked by the user. It is also possible that the pricing models booked by the user are stored in the vehicle and are then transmitted to the charging station. Using this information, also the charging station can determine the power supply offers.

In this case it is also possible that a charging preference for users is stored in a central unit. If an identification of a user and/or a vehicle is known in the central unit, the charging preference of the user can be identified in the central unit. The charging preference can be associated with the pricing model of the customer, for example. Thus a first customer may have chosen a pricing model which entitles him only to receive conventionally produced current, for example. Another customer, however, may have chosen a pricing model which guarantees the supply of current produced from renewable energy. This charging preference may be taken into account when selecting the power supply offer.

The charging station can communicate with a central control center by means of a communication protocol when transmitting a vehicle identification, for example, and can retrieve the pricing models booked by the user based on the vehicle identification. In this case the charging station may at first inquire available power supply offers from the control center when a charging process is requested. Depending on the available power supply offers received by the charging station, the station then can transmit corresponding power supply offers to the vehicle.

According to an advantageous embodiment it is proposed that one of the adapted power supply offers is selected by the vehicle and that information concerning the selected power supply offer is transmitted to the charging station. After the adapted power supply offers have been received in the vehicle they can be presented to the user for selection. This may be done by displaying them on a display screen in the vehicle, for example. Then the user can select the desired power supply offer. The selected power supply offer is then transmitted to the charging station. For this purpose it is also possible that either parameters of the power supply offer or a reference to a power supply offer are transmitted to the charging station from the vehicle. Also this communication may be performed via TCP/IP.

The communication between vehicle and charging station may be done wireless, for example by means of WLan, Bluetooth, infrared, GSM, UMTS or the like. Also a communication by wire is possible, for example via the charging cable.

According to an advantageous embodiment, the remaining charge time can be calculated by the vehicle after the adapted power supply offers have been received in the vehicle. The determined charge time can be presented to the user together with the power supply offers on the display. In this way, the user can decide, for example, if he wants to accept a longer charging process, wherein the energy received may be cheaper. Calculating the charge time may be done by determining an approximate duration of charge, for example. The estimated charge time can be determined based on measured parameters, for example. It can differ from the actual end of charge since measured parameters, for example ambient temperature, battery temperature and the like may change.

After a user has selected a power supply offer in the vehicle this information is transmitted to the charging station. After the charging station has received this information a power corresponding to the selected power supply offer can be made available on the charging cable by means of the charging station. For this purpose the charging station can request the corresponding power supply offer from the central unit. The charging process thus can be initiated after the selected power supply offer has been received in the charging station.

According to an advantageous embodiment it is further proposed that the charging station calculates the remaining charge time based on the selected power supply offer. In this way the remaining charge time can be indicated in the charging station, for example. The remaining charge time can also be communicated via the charging cable into the vehicle. A different communication between charging station and vehicle is also possible. Calculation of the charge time can be a determination of the estimated duration of charge, for example. Based on measured parameters an expected charge time can be determined. This may differ from the actual end of charge time.

According to an advantageous embodiment it is proposed that the adapted power supply offers are indicated in the vehicle. For this purpose a flat screen display, for example, e.g. a LCD display can be used. It is also possible to indicate the power supply offers on a touch-sensitive screen.

The power supply offers are displayed via a user interface in a selectable manner to allow the user a particularly simple selection of power supply offers.

A further subject matter is a device for monitoring the charging process of electric vehicles comprising charging means for electrically connecting an electric vehicle to a charging station for receiving electric energy, detecting means for detecting in the vehicle at least a state of charge of the battery as well as a desired charge time, calculating means for determining in the vehicle the required energy for fully charging the battery, communication means for transmitting by the vehicle at least information concerning the required energy and the charge time to the charging station, wherein the communication means are adapted to receive in the vehicle at least one power supply offer adapted to the information, which power supply offer has been determined from among a plurality of different power supply offers by means of the charging station using the information received.

A further subject matter is a method for charging electric vehicles wherein a charging station is connected to an electric vehicle for supplying electric energy, wherein information concerning at least the required energy for fully charging a battery in the vehicle and concerning the charge time is received in the charging station, at least one determined power supply offer adapted to the information is selected from among different power supply offers based on the received information, and the determined power supply offer is transmitted to the vehicle by the charging station.

The charging station can inquire available power supply offers from a central unit based on the received information. Furthermore the central unit can determine charging preferences of the user using a vehicle identification and, depending on the charging preferences as well as on the information concerning the state of charge and the desired charge time, determine at least one power supply offer from among a plurality of offers.

Another subject matter is a device for charging electric vehicles comprising a charging station which can be connected to an electric vehicle for supplying electric energy, a receiving device arranged in the charging station for receiving information concerning at least the energy required in the vehicle for fully charging a battery and the charge time, a communication device arranged in the charging station for communication with a central unit and for transmitting the information received from the vehicle to the central unit as well as for receiving from the central unit at least one power supply offer adapted to the information received from among different power supply offers, and a transmitting device arranged in the charging station for transmitting said at least one determined power supply offer to the vehicle.

DETAILED DESCRIPTION OF THE DRAWINGS

In the following the subject matter will be explained in detail with reference to a drawing illustrating embodiments thereof. In the drawing.

DETAILED DESCRIPTION OF THE INVENTION

Figure 1:
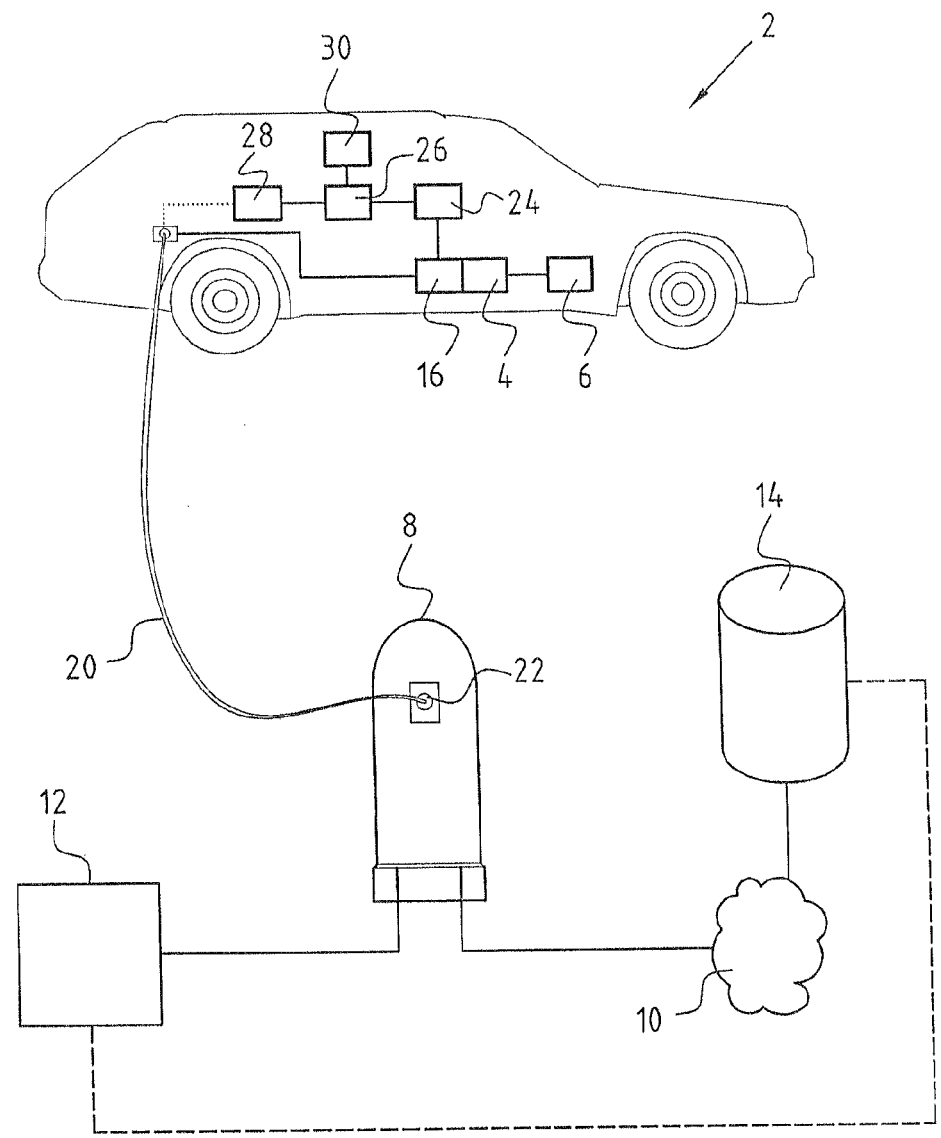
FIG. 1 shows an exemplary configuration of a device for monitoring charging of electric vehicles.

FIG. 1 shows a vehicle 2 comprising a battery 4 and an electric motor 6. Furthermore FIG. 1 shows a charging station 8, a communication network 10, a power supply grid 12 as well as a control center (central unit) 14.

In the vehicle 2 a charger 16 is arranged at the battery 4 for controlling charging of the battery 4. The charger 16 is connected to an electric connector box 18. The vehicle 2 can be connected by means of the electric connector box 18 via a charging cable 22 to a connector box 22 of the charging station 8 and thus receive electric energy from the power supply grid 12.

Furthermore, a measuring device 24 is provided in the vehicle 2 which is electrically connected to the battery 4 and the charger 16. The measuring device permits detecting the state of charge (SOC) of the battery 4. The measuring device 24 is connected to a central control unit 26. In addition, the central control unit 26 is connected to a communication unit 28. Furthermore the central control unit 26 is connected to a touch-sensitive display 30.

Figure 2:
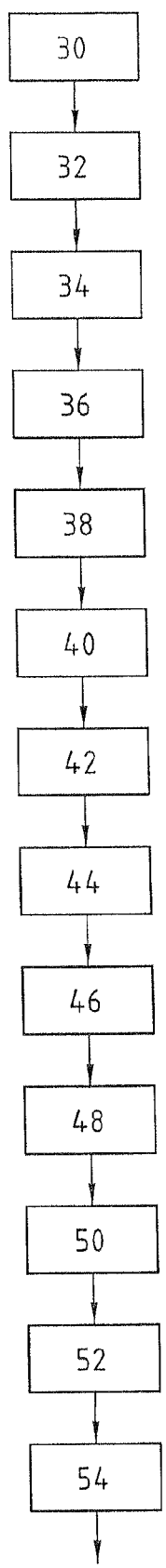
FIG. 2 shows an exemplary flowchart.

In the following the process for determining a desired power supply offer and for charging the vehicle will be illustrated according to the flow chart in FIG. 2.

In a first step 30 the vehicle 2 is electrically connected to the charging station 8 by means of the charging cable 20 via the connector boxes 18 and 22. The electric connection is detected by means of the central control unit 26. In a next step 32 the central control unit 26 generates a user identification and/or a vehicle identification which is modulated upon the charging cable 20 by the communicating unit 28. The corresponding identification data are received in the charging station 8 and transmitted to the control center 14 via the communication network 10. Based on the identification data a set of charging preferences booked by the user is determined in the control center 14. These charging preferences can correspond to different pricing models.

Subsequently the state of charge of the battery is detected by means of the measuring device 24 in the vehicle 2 in a step 36. In addition a user can enter a desired charge time via the touch-sensitive display 30. In doing so, the user can indicate how long the charging process should take, for example. The user could also indicate a time interval during which charging should be effected. This might be done by the user by indicating that the charging should be performed between 22 hours and 6 hours.

In step 38 the central control unit 26 receives the state of charge of the battery from the measuring device 24 as well as the desired charge time from the touch-sensitive display 30. Based on the desired charge time as well as the state of charge the central control unit 26 determines the amount of energy required for fully charging the battery within the desired charging period. For this purpose the central control unit 26, for example, can calculate the electric power required for fully charging the battery 4 by means of the charger 16 during the desired charge time.

The information related to the required energy or the required power, respectively, is transmitted from the central control unit to the communication unit in step 40. Subsequently the communication unit 28 encodes this information and modulates it upon the charging cable 20.

In step 42 the charging station 8 receives the information concerning the required energy and the charge time from the vehicle 2. The charging station or a communication unit installed in the charging station, respectively, transmits these data to the central unit 14. Based on these data an available power supply offer is then determined in the central unit 14. In doing so, the charging preference of the customer can be taken into account. The charging preference of a customer can be selectable independent of a pricing model as well. For example, already when requesting a charging process the customer can indicate a charging preference which is transmitted together with the information concerning the required energy and the charge time to the charging station 8 and on to the central unit 14. Thus the central unit 14 determines at least one power supply offer.

Subsequently said at least one power supply offer is transmitted from the central unit 14 via the communication network to the charging station 8 and temporarily stored in the charging station 8 in a step 34.

The determined power supply offers are transmitted from the charging station 8 to the vehicle 2 via the charging cable 20 in a step 44.

The communication unit 28 receives the determined power supply offers and sends information concerning the possible power supply offers to the central control unit 26. In addition to the power and energy corresponding to each of the power supply offers also a pricing, for example an indication of the costs per kilowatt hour is indicated in the central control unit 26. All information is preferably contained in a data record which was received by the charging station from the central unit and is transmitted to the vehicle. In this way it is possible that the pricing parameters are transmitted together with the power supply offer via the charging cable 20 from the charging station 8 to the vehicle 2 and thus are available in the central control unit 26.

This information can also be acquired for example by checking a lookup table in which all power supply offers are stored associated with specific pricing parameters.

In step 46 available power supply offers are presented to the user by means of the central control unit 26 and the touch-sensitive display 30. In step 48 the user selects the desired power supply offer.

In step 50 the communication unit 28 transmits the selected power supply offer via the charging cable 20 to the charging station 8. This transmission may be a reference to the selected power supply offer, for example. In step 52 the selected power supply offer is transmitted in the charging station 8 to the control center 14 via the communication network 10. The control center 14 causes the charging station 8 to obtain the energy or power, respectively, corresponding to the power supply offer via the power supply grid 12. The power available, in particular the maximum available current is supplied to the vehicle 2 via the charging cable 20. In step 54 the supplied electric power is used in the charger 16 to charge the battery 4.

During the charging process the state of charge can be detected by means of the measuring device 24 and displayed on the touch-sensitive display 30 through the central control unit 26. Also the (estimated) remaining charge time can be displayed for the user by means of the central control unit 26 and the measuring device 24.

By means of the method described as well as the device described above it is possible to make available for the user a selection of different pricing offers for charging his electric vehicle.

The invention claimed is:

1. A method for charging electric vehicles, comprising:
    connecting an electric vehicle to a charging station for receiving electric energy,
    determining at least a state of charge of a battery and a desired duration of charge in the vehicle,
    determining the energy required for fully charging the battery in the vehicle,
    transmitting at least information concerning the required energy and the duration of charge to the charging station by the vehicle,
    receiving in the vehicle different power supply offer adapted to the information, which power supply offer has been determined from among a plurality of different power supply offers by means of the charging station using the information received,
    selecting one of the adapted power supply offers in the vehicle and
    transmitting information concerning the selected power supply offer from the vehicle to the charging station.

2. The method of claim 1, wherein the adapted power supply offers contain at least two power supply offers, wherein the currents, and/or the voltages and/or the prices of the at least two power supply offers differ from each other.

3. The method of claim 1, wherein based on the selected power supply offer a remaining charge time is calculated in the vehicle.

4. The method of claim 1, wherein the charging station provides a corresponding power on the charging cable after having received information concerning the selected power supply offer.

5. The method of claim 1, wherein the charging station calculates the remaining charge time based on the selected power supply offer.

6. The method of claim 1, wherein the adapted power supply offers are indicated in the vehicle.

7. The method according to claim 6, wherein in that the adapted power supply offers are selectable in the vehicle through a user interface.

8. A device for charging electric vehicles, comprising:
    charging means for electrically connecting an electric vehicle to a charging station for receiving electric energy,
    detecting means for detecting in the vehicle at least a state of charge of a battery as well as a desired charge time,
    calculating means for determining in the vehicle the required energy for fully charging the battery,
    communication means for transmitting by the vehicle at least information concerning the required energy and the charge time to the charging station,
    wherein the communication means are adapted for receiving in the vehicle different power supply offers adapted to the information, which power supply offer has been determined from among a plurality of different power supply offers by means of the charging station using the information received,
    calculation means adapted for selecting one of the adapted power supply offers in the vehicle and,
    communication means adapted for transmitting information concerning the selected power supply offer from the vehicle to the charging station.

9. A method for charging electric vehicles, wherein a charging station is connected to an electric vehicle for supplying electric energy, comprising:
    wherein information concerning at least the required energy for fully charging a battery in the vehicle and concerning the charge time are received in the charging station,
    based on the received information, different determined power supply offers adapted to the information are selected from among different power supply offers and
    the determined power supply offers are transmitted to the vehicle by the charging station,
    information relating to a vehicle side selected power supply offer out of the determined power supply offers are received in the charging station.

10. A device for charging electric vehicles, comprising:
    a charging station which can be connected to an electric vehicle for supplying electric energy,
    a receiving device arranged in the charging station adapted for receiving information concerning at least the energy required in the vehicle for fully charging a battery and the charge time,
    a communication device arranged in the charging station adapted for communication with a central unit and for transmitting the information received from the vehicle to the central unit as well as for receiving from the central unit different power supply offers from among different power supply offers which are adapted to the information received and
    a transmitting device arranged in the charging station for transmitting said different determined adapted power supply offers to the vehicle,
    a receiving unit arranged in the charging station adapted for receiving of information relating to a vehicle side selected power supply offer out of the determined power supply offers.

* * * * *